United States Patent [19]

Gisler

[11] Patent Number: 5,216,136
[45] Date of Patent: Jun. 1, 1993

[54] FIBER-REACTIVE DISAZO DYES CONTAINING PIPERAZINO LINKING RADICALS AND PROCESSES OF DYEING THEREWITH

[75] Inventor: Markus Gisler, Rheinfelden, Switzerland

[73] Assignee: Sandoz Ltd., Basel, Switzerland

[21] Appl. No.: 674,440

[22] Filed: Mar. 22, 1991

Related U.S. Application Data

[63] Continuation of Ser. No. 387,258, Jul. 28, 1989, abandoned.

[30] Foreign Application Priority Data

Aug. 1, 1988 [DE] Fed. Rep. of Germany ....... 3826104

[51] Int. Cl.$^5$ .................... C09B 62/26; C09B 62/08; C09B 62/40; C09B 29/00
[52] U.S. Cl. .................. 534/634; 534/630; 534/632; 8/688; 544/209
[58] Field of Search ................. 8/688; 544/209; 534/630, 632, 634

[56] References Cited

U.S. PATENT DOCUMENTS

| | | | |
|---|---|---|---|
| 3,261,825 | 7/1966 | Lesslie et al. | 8/681 |
| 3,340,000 | 9/1967 | Shansky | 8/688 |
| 3,474,084 | 10/1969 | Griffiths et al. | 544/209 |
| 3,530,121 | 9/1970 | Heimberger et al. | 544/209 |
| 3,580,912 | 5/1971 | Heimberger et al. | 544/209 |
| 4,511,507 | 4/1985 | Kayane et al. | 8/688 |

FOREIGN PATENT DOCUMENTS

| | | |
|---|---|---|
| 34287 | 8/1981 | European Pat. Off. |
| 51-26386 | 3/1976 | Japan. |
| 1405016 | 8/1971 | United Kingdom. |
| 1461125 | 1/1977 | United Kingdom. |

Primary Examiner—Paul Lieberman
Assistant Examiner—William S. Parks
Attorney, Agent, or Firm—Robert S. Honor; Melvyn M. Kassenoff

[57] ABSTRACT

Compounds of the formula

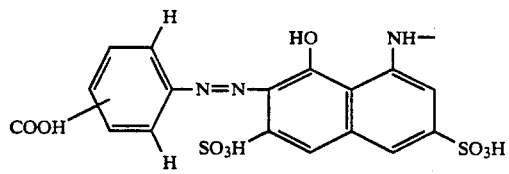

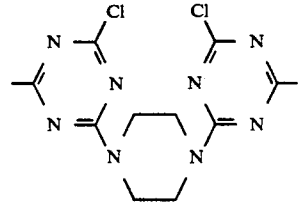

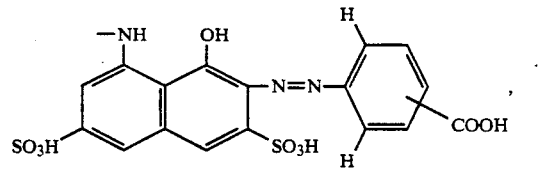

and salts thereof, and their use as as reactive dyes for the dyeing and printing of hydroxy group- and nitrogen-containing organic substrates, e.g., leather, natural and synthetic polyamides and natural and regenerated cellulose.

14 Claims, No Drawings

FIBER-REACTIVE DISAZO DYES CONTAINING PIPERAZINO LINKING RADICALS AND PROCESSES OF DYEING THEREWITH

This is a continuation of application Ser. No. 07/387,258, filed Jul. 28, 1989, now abandoned.

This invention relates to disazo compounds containing heterocyclic fibre-reactive groups, processes for their preparation and their use as fibre-reactive dyestuffs.

More particularly, this invention provides compounds of formula I in free acid or salt form

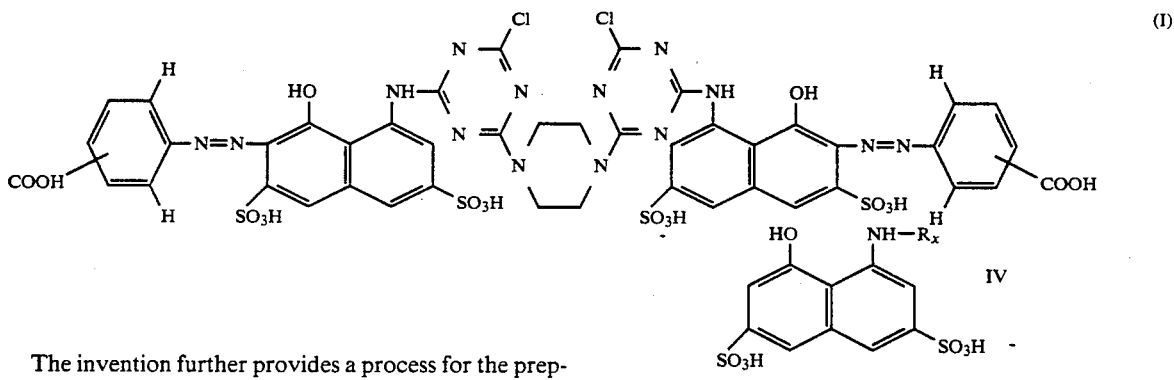

The invention further provides a process for the preparation of compounds of formula I comprising reacting one mole of two different compounds of formula II

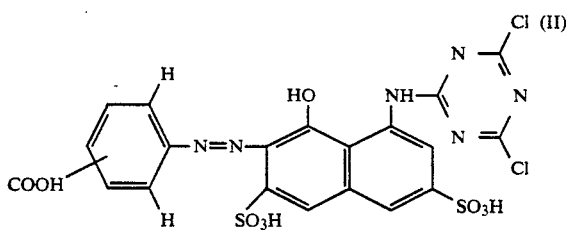

or two moles of the same compound of formula II in free acid or salt form with one mole of piperazine.

This reaction may be carried out by known methods suitably at between room temperature and slightly elevated temperature.

The compounds of formula I may be isolated in accordance with known methods, for example by conventional salting out with alkali metal salts, filtering and drying, optionally in vacuo.

Conversion from free acid form to single or mixed salt form or vice versa or interconversion between salt forms may be performed by conventional means.

Compounds of formula I may be prepared for use as dyestuffs in salt form in which the cations used are non-chromophoric cations capable of forming water soluble salts. Suitable cations are those conventional in the field of fibre-reactive dyestuffs, such as, for example, alkali metal cations or unsubstituted or substituted ammonium cations, e.g. lithium, sodium, potassium, ammonium, mono-, di-, tri- and tetra-methyl- or ethyl-ammonium, mono-, di- and tri-ethanolammonium cations. Preferably the cations are sodium.

The starting compounds of formula II can be made using known starting compounds, for example, by alkaline coupling one mole of the diazonium compound of the amine of formula III

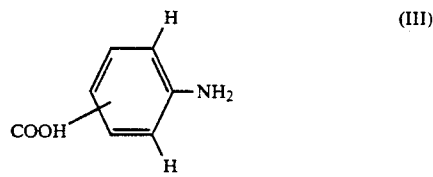

with 1 mole of a compound of formula IV (IV)

in which $R_x$ is hydrogen, a removable protecting group, e.g., the acetyl group, or $R_x$ is 2,4-dichlorotriazin-6-yl, and followed by a) in the case where $R_x$ is hydrogen, reacting with cyanuric chloride using a molar ratio of 1:1, and b) in the case where $R_x$ is a protecting group, removing the protecting group and reacting the resulting primary amino group with cyanuric chloride using a molar ratio of 1:1.

The compounds of formula I and mixtures thereof are useful as fibre-reactive dyestuffs for dyeing or printing hydroxy group- or nitrogen- containing organic substrates. Preferred substrates are leather and fibre material containing or consisting of natural or synthetic polyamides and, particularly, of natural or regenerated cellulose such as cotton, viscose and spun rayon. The most preferred substrate is textile material containing or consisting of cotton.

Dyeing or printing is carried out by known methods conventional in the fibre-reactive dyestuff field. Preferably, the compounds of formula I are applied by exhaust dyeing.

It is an advantage of the present invention that dyeing with the compounds of formula I is not temperature dependent in the 60°–120° C. dyeing temperature range. Therefore, dyeing may be effected almost equally well at 80° C. as at 100° C. without any essential loss of fixation yield, and dyeings of practically the same colour strength are obtained.

The compounds of this invention are compatible with other fibre-reactive dyestuffs; they may be applied per se or in combination with appropriate fibre-reactive dyestuffs of the same class having analogous dyeing properties, e.g., fastness properties, extent of ability to exhaust from the dyebath onto the fibre etc. The dyeings obtained with such combination mixtures have good fastness properties and are comparable to those obtained with a single dyestuff.

The compounds of formula I show high exhaust and fixation yields. Any unfixed dyestuff can be easily washed off the substrate. The build-up power of the compounds is also good. The dyeings and prints obtained show good fastness properties, especially with respect to dry and wet light fastness properties and general wet fastnesses such as fastness to washing, water, sea water and sweat. They are also resistant to oxidative influences, e.g., chlorinated water, hypochlorite bleach and peroxide- or perborate- containing wash fluids.

In particular, the dyeings obtained with the compounds of formula I have a surprisingly high acid stability, for example, a dyeing when contacted with dilute acetic acid, only shows a slight staining of the undyed accompanying fabric.

The invention will now be illustrated by the following examples. In the examples all parts and percentages are by weight unless indicated to the contrary. All temperatures are in degrees Centigrade.

EXAMPLE 1

40 parts of 30% hydrochloric acid and 200 parts of ice are added to 27 parts of 4-aminobenzoic acid which are suspended in 200 parts of water. 50 parts of a 4N sodium nitrite solution are added dropwise at 0° over a period of 15 minutes and a brown suspension results. Any excess nitrite is decomposed with ca. 5 parts of 10% sulphamic acid. The resulting suspension is added dropwise over a period of 20 minutes to a solution of 67 parts of 1-amino-8-hydroxynaphthalene-3,6-disulphonic acid and 35 parts of calcined soda in 200 parts of water. During the addition, the temperature of the reaction mixture is kept at 0° by adding ice. Simultaneously, the pH of the mixture is kept at 8.5 for ca. one hour by the addition of a 20% soda solution. When no diazonium compound is detectable any longer, the solution is neutralised (pH 7) by adding 30 parts of 10% hydrochloric acid, followed by 300 parts of sodium chloride. Stirring is effected overnight. A monoazo compound of the formula $1_b$

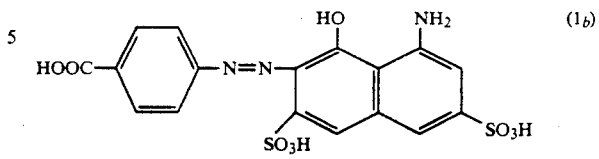

precipitates out and the precipitate is filtered and dried.

The monoazo compound of formula $1_b$ is redissolved in 2000 parts of water and added to a suspension of 45 parts of cyanuric chloride in 700 parts of a mixture of water and ice. This suspension is stirred at 5° for approximately three hours at a constant pH of 6–7 maintained by the addition of 95 parts of a 20% soda solution. 8 parts of piperazine are added to the resultant mixture, and the mixture is stirred for ca. 20 hours at room temperature. To complete the reaction, the mixture is stirred for a further eight hours at 40°. Subsequently, the pH of the reaction mixture is adjusted to 7.5 by the addition of 15 parts of disodium hydrogen phosphate. The resulting dyestuff which precipitates on adding 600 parts by volume of sodium chloride is of the formula $1_a$

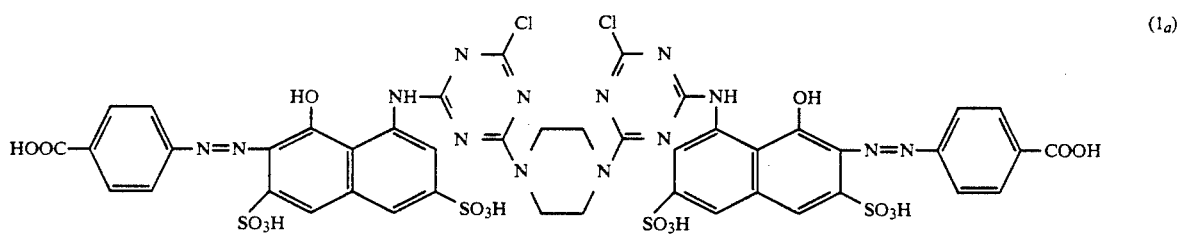

in sodium salt form.

On drying a dark red-powder results which is readily soluble in water.

The dyestuff dyes cotton a brilliant bluish-red shade. These dyeings show good general fastness properties, e.g., good light and wet fastnesses, particularly good wet light fastness and high resistance to oxidative influences and acid hydrolysis.

EXAMPLES 2 AND 3

By analogy with the method described in Example 1 and using appropriate starting compounds, compounds of formulae $2_a$ and $3_a$

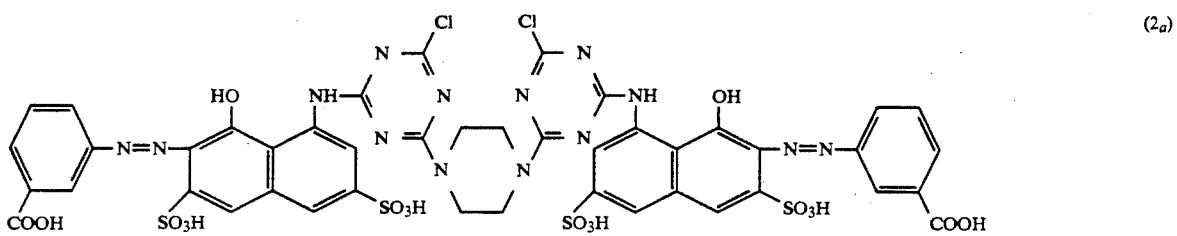

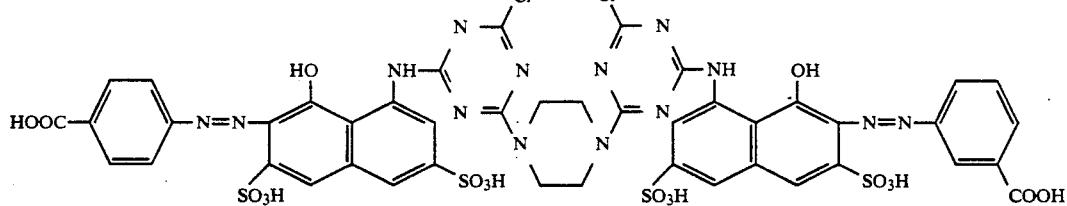

(3a)

can be prepared.

The dyestuffs of Examples 2 and 3 are obtained in sodium salt form.

These dyestuffs in salt form may be applied to natural or regenerated cellulose fibres, and particularly to cotton fabrics, conventional exhaust dyeing methods. Bluish-red dyeings showing good fastness properties are obtained.

APPLICATION EXAMPLE A 50 parts of mercerized cotton fabric are added to a dyebath consisting of 1000 parts of water, 20 parts of Glauber's salt (calcined), 2.5 parts of sodium carbonate (calcined) and 1 part of the sodium salt of 1-nitrobenzene-3-sulphonic acid. The bath is heated to 40°, then 1 part of the compound of formula $1_a$ of Example 1 is added. The temperature is raised to 98° over 45 minutes. During this time, 20 parts of Glauber's salt (calcined) are added after 15 minutes and a further 20 parts of Glauber's salt (calcined) are added after a further 15 minutes. At the end of this time 7.5 parts of sodium carbonate (calcined) are added. Dyeing is continued at the boil for 45 to 60 minutes. Subsequently, the dyed fabric is removed from the liquor, rinsed with running hot water, and washed at the boil for 15 minutes in 500 parts of demineralised water in the presence of 0.25 parts of a commercially available anion-active detergent. After rinsing and drying a bluish-red cotton dyeing with good light and wet fastness properties is obtained.

APPLICATION EXAMPLE B

1 Part of the compound of formula $1_a$ of Example 1 is dissolved in 2000 parts of water. 100 Parts of cotton fabric are added and the temperature of the dyebath is raised to 80° over 10 minutes. 100 Parts of Glauber's salt (calcined) are added and 20 parts of sodium carbonate (calcined) are added over 30 minutes. Dyeing is continued for one hour at 80°. Subsequently, the dyed fabric is rinsed with cold running water and then with hot water, and is washed as in Application Example A. After rinsing and drying, a bluish-red cotton dyeing is obtained having good fastness properties.

APPLICATION EXAMPLE C

A printing paste consisting of

| | |
|---|---|
| 40 parts | of the compound of formula $1_a$ of Example 1 |
| 100 parts | of urea |
| 340 parts | of water |
| 500 parts | of a 4% sodium alginate thickener, and |
| 20 parts | of sodium carbonate |
| 1000 parts | total | is applied to cotton fabric by a conventional printing method.

The printed fabric is dried and fixed in steam at 102°–104° for 1–8 minutes. It is then rinsed with cold and hot water, washed at the boil (according to the method described in Application Example A) and dried. The resulting bluish-red print shows good general fastness properties.

In Application Examples A to C, an appropriate amount of the compound of formula $2_a$ or $3_a$ of Example 2 or 3 may be employed in place of that of the compound of formula $1_a$. In all cases, bluish-red dyeings (Examples A and B) or prints (Example C) are obtained having good fastness properties.

What is claimed is:

1. A compound of the formula

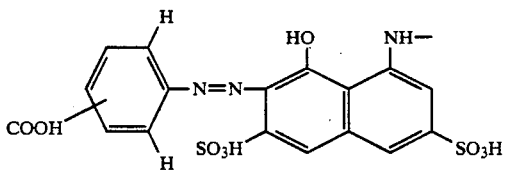

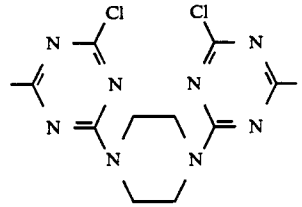

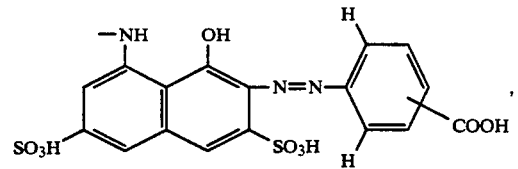

or a salt thereof.

2. A compound according to claim 1, or a salt thereof each cation of which is independently a non-chromophoric cation.

3. A compound according to claim 2, or a salt thereof each cation of which is independently lithium, sodium, potassium, ammonium, methylammonium, dimethylammonium, trimethylammonium, tetramethylammonium, ethylammonium, diethylammonium, triethylammonium, tetraethylammonium, ethanolammonium, diethanolammonium or triethanolammonium.

4. A compound according to claim 3, or a salt thereof the cations of which are identical.

5. A compound according to claim 4, or a sodium salt thereof.

6. The compound according to claim 2 having the formula

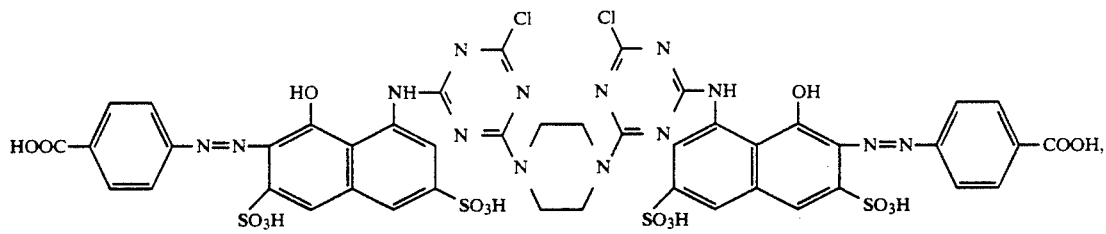

or a salt thereof each cation of which is independently a non-chromophoric cation.

7. The compound according to claim 6 in sodium salt form.

8. The compound according to claim 2 having the formula

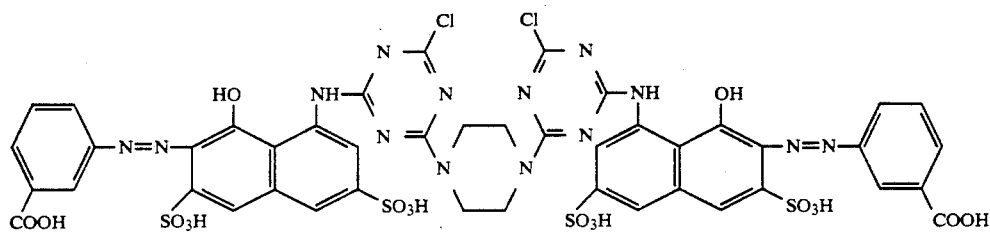

or a salt thereof each cation of which is independently a non-chromophoric cation.

9. The compound according to claim 8 in sodium salt form.

10. The compound according to claim 2 having the formula

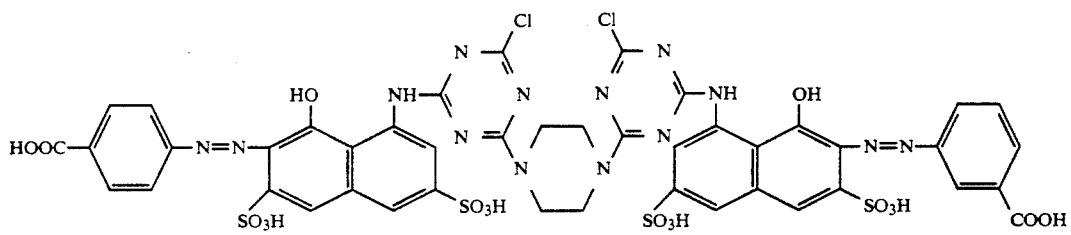

or a salt thereof each cation of which is independently a non-chromophoric cation.

11. The compound according to claim 10 in sodium salt form.

12. A process for dyeing or printing an hydroxy group- or nitrogen-containing organic substrate comprising applying a compound according to claim 2, or a salt thereof each cation of which is independently a non-chromophoric cation, to an hydroxy group- or nitrogen-containing organic substrate.

13. A process according to claim 12 wherein the hydroxy group- or nitrogen-containing organic substrate is leather or fibers of or a textile material comprising a natural or synthetic polyamide or natural or regenerated cellulose.

14. A process for the preparation of a compound according to claim 8 which comprises reacting one mole of two different compounds of the formula

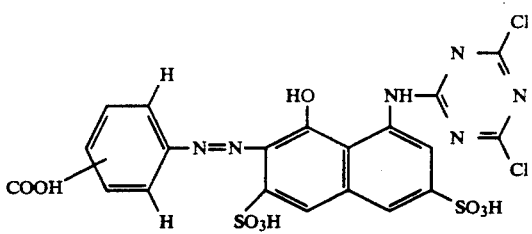

or two moles of the same compound of said formula, in free acid or salt form, with one mole of piperazine.

* * * * *